(12) United States Patent
Yamamoto et al.

(10) Patent No.: US 9,994,171 B2
(45) Date of Patent: Jun. 12, 2018

(54) CLAMP MARK AND WIRE HARNESS

(71) Applicant: Yazaki Corporation, Tokyo (JP)

(72) Inventors: Masataka Yamamoto, Makinohara (JP); Takehiko Uehara, Makinohara (JP); Takahisa Nagatsu, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/692,404

(22) Filed: Aug. 31, 2017

(65) Prior Publication Data
US 2018/0065574 A1  Mar. 8, 2018

(30) Foreign Application Priority Data

Sep. 5, 2016 (JP) .................. 2016-172937

(51) Int. Cl.
*H01B 7/36* (2006.01)
*H01B 13/012* (2006.01)
*B60R 16/02* (2006.01)
*H02G 1/06* (2006.01)
*H02G 3/32* (2006.01)

(52) U.S. Cl.
CPC ......... *B60R 16/0215* (2013.01); *H01B 7/368* (2013.01); *H01B 13/01281* (2013.01); *H02G 1/06* (2013.01); *H02G 3/32* (2013.01)

(58) Field of Classification Search
CPC ........ B60R 16/0215; H01L 313/01281; H02G 1/06; H02G 3/32
See application file for complete search history.

(56) References Cited

U.S. PATENT DOCUMENTS

| 2005/0092511 A1* | 5/2005 | Sekino ............... B60R 16/0215 174/72 A |
| 2014/0251683 A1* | 9/2014 | Yamamoto .......... B60R 16/0215 174/72 A |
| 2015/0083462 A1* | 3/2015 | Yoshida ................... F16B 2/06 174/136 |

FOREIGN PATENT DOCUMENTS

| JP | 2010-260297 A | 11/2010 |
| JP | 2012-30429 A | 2/2012 |
| JP | 2013-103492 A | 5/2013 |
| JP | 2016-144279 A | 8/2016 |

* cited by examiner

*Primary Examiner* — Timothy Thompson
*Assistant Examiner* — Amol Patel
(74) *Attorney, Agent, or Firm* — Sughrue Mion, PLLC (57) ABSTRACT

A clamp mark includes a mark main body and flange parts. The mark main body, is made of resin material by molding, and covers a circumference of an electric wire entirely in a circumference direction of the electric wire at a predetermined position of the electric wire in an axial direction of the electric wire. The flange parts are respectively provided on both end portions of the mark main body in the axial direction of the electric wire so as to project outward in a radial direction of the electric wire from an outer peripheral surface of the mark main body. A cross section of the mark main body, which is perpendicular to the axial direction, is not precise circle.

9 Claims, 9 Drawing Sheets

CLAMP MARK AND WIRE HARNESS

CROSS REFERENCE TO RELATED APPLICATIONS

This application is based on Japanese Patent Application (No. 2016-172937) filed on Sep. 5, 2016, the contents of which are incorporated herein by way of reference.

BACKGROUND

The invention relates to an electric wire integrated clamp mark and a wire harness.

In a wire harness used for an automobile etc., one or multiple electric wires bundled are fixed to a frame of vehicle mounted equipment or a support part of a vehicle body panel or the like using various fixing devices (such as a clip, a locking device, and a protective tube with a locking device).

A wire harness is configured such that multiple electric wires are collected by a vinyl tape or the like and divided into a trunk line or a branch line, and connectors or terminals are attached to the respective ends of the electric wires. Since the wire harness is manufactured in advance with a predetermined length, unless the wire harness is mounted on the predetermined position of the vehicle, there can occur a case in which it cannot be connected to its mating connector or mating terminal part. Thus, in order to facilitate the mounting work of the wire harness on the predetermined position of the vehicle, in some cases, an electric wire integrated clamp mark is attached to the wire harness (see, for example, the patent document 1).

Figure 9A:
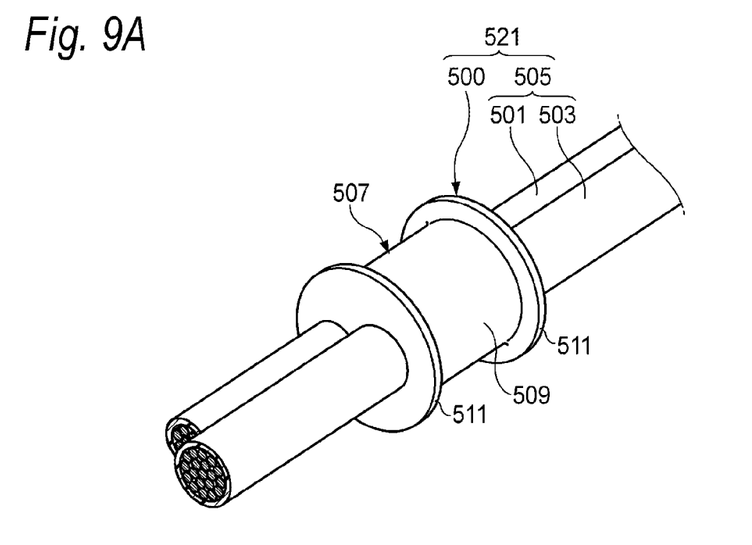
FIG. 9A is a perspective view of a conventional electric wire integrated clamp mark.

As shown in FIG. 9A, in an electric wire integrated clamp mark 500 disclosed in the patent document 1, a mark main body 507 molded out of resin material integrally with two electric wires 505 composed of a small diameter electric wire 501 and a large diameter electric wire 503 so as to surround the entire circumferences of the two electric wires 505 includes: a cylindrical part 509 formed in the outer peripheral surface of the mark main body 507; and, flange parts 511 formed on the two end sides of the mark main body 507 in the axial direction of the electric wires 505. After the electric wire integrated clamp mark 500 is fixed to a vehicle body or the like by a P clamp 513 attached to the cylindrical part 509, its movement with respect to the electric wires 505 is regulated.

Figure 9B:
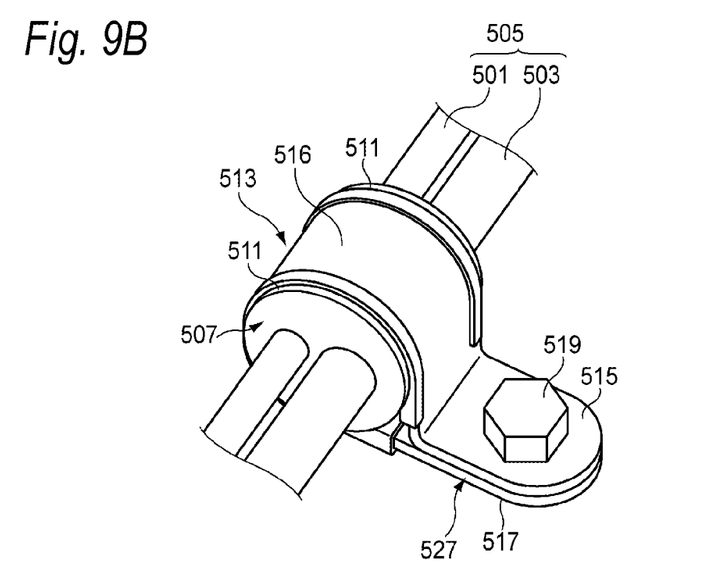
FIG. 9B is a perspective view of a state where the electric wire integrated clamp mark shown in FIG. 9A is fixed by a clamp member.

In the P clamp 513, as shown in FIG. 9B, the tightening piece part 515 and fixing piece part 517 of the clamp main body 527 are tightened by a mounting bolt 519 penetrating through the bolt penetration holes of the two piece parts, whereby the arc shaped part 516 thereof surrounds and tightens the cylindrical part 509 of the electric wire integrated clamp mark 500. In this case, the mounting bolt 519 is penetrated through a clamp mounting hole formed in a vehicle body panel or a bracket to tighten together the vehicle panel etc. and the P clamp 513. Thus, the wire harness 521 is fixed through the electric wire integrated clamp mark 500 to the predetermined position of the vehicle panel etc. by the P clamp 513.

[Patent Document 1] JP 2016-144279 A

SUMMARY

The invention is made in view of the above circumstances and thus its object is to provide an electric wire integrated clamp mark and a wire harness which, when assembling to the vehicle, can regulate the orientation of electric wire rotation direction and, after assembled to the vehicle, can prevent the electric wires from being rotated due to vibrations or the like.

The above object of the invention can be attained by the following configurations.

(i) A clamp mark, including:
a mark main body, made of resin material by molding, and configured to cover a circumference of an electric wire entirely in a circumference direction of the electric wire at a predetermined position of the electric wire in an axial direction of the electric wire; and flange parts respectively provided on both end portions of the mark main body in the axial direction of the electric wire so as to project outward in a radial direction of the electric wire from an outer peripheral surface of the mark main body, wherein a cross section of the mark main body, which is perpendicular to the axial direction, is not precise circle.

(ii) The clamp mark according to the above (i), wherein the cross section of the mark main body has line symmetric shape.

(iii) The clamp mark according to the above (i) or (ii), wherein a reduced-thickness portion is provided on the outer peripheral surface of the mark main body at a counter gate side which is opposite to a gate side that a gate is disposed for the molding.

(iv) The clamp mark according to the above (iii), wherein a rib is provided in the reduced-thickness portion.

(v) A wire harness, comprising:
the electric wire; and
the clamp mark according to any one of the above (i) to (iv), which is integrally molded with the electric wire.

DETAILED DESCRIPTION OF EXEMPLIFIED EMBODIMENT

In the electric wire integrated clamp mark 500 shown in FIGS. 9A and 9B, when assembling it to the vehicle, the wire harness 521 arranged on the vehicle is bolt tightened and fixed using the P clamp 513. In this case, since the outer peripheral surface of the mark main body 507 is the cylindrical part 509, the orientation of the rotation direction of the electric wire integrated clamp mark 500 cannot be regulated, thereby raising a fear that it can be mounted in a state where the electric wires 500 are twisted. Also, after assembled to the vehicle, when the electric wires 505 are oscillated due to a force applied thereto by the vibrations of the vehicle while driving the vehicle, such oscillations or the like can raise a fear that the electric wire integrated clamp mark 500 can be relatively rotated with respect to the P clamp 513 and thus the electric wires 505 can be twisted. Occurrence of such twisting in the electric wires 505 applies a load to the core wires thereof, thereby raising a possibility that the electrical conduction performance thereof can be lowered.

The invention is made in view of the above circumstances and thus one object of the invention is to provide an electric wire integrated clamp mark and a wire harness which, when assembling to the vehicle, can regulate the orientation of electric wire rotation direction and, after assembled to the vehicle, can prevent the electric wires from being rotated due to vibrations or the like.

Description is given below of an embodiment according to the invention with reference to the drawings.

Figure 1:
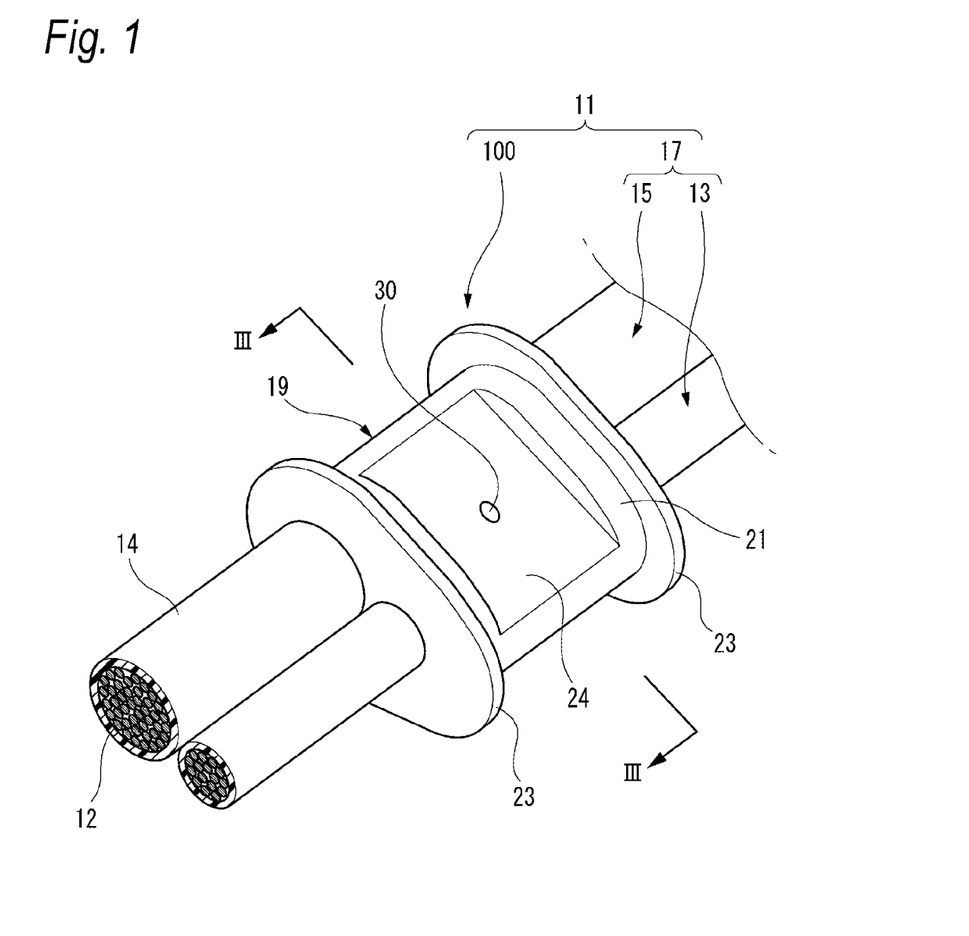
FIG. 1 is a perspective view of a gate side surface of an electric wire integrated clamp mark according to an embodiment of the invention, shown together with an electric wire.

FIG. 1 is a perspective view of an electric wire integrated clamp mark 100 according to an embodiment of the invention, shown together with an electric wire 17.

The electric wire integrated clamp mark 100 of this embodiment is applied to various kinds of wire harnesses to be mounted on a vehicle. In the following embodiment, description is given of an example in which the electric wire integrated clamp mark 100 is used in a battery cable 11 serving as a wire harness. The battery cable 11 includes, for example, two electric wires 17 composed of a small diameter electric wire 13 and a large diameter electric wire 15. Each electric wire 17 is a covered wire in which a conductor 12 composed of a stranded wire or a single wire is covered with an insulating sheath 14. To configure the battery cable 11, the electric wire integrated clamp mark 100 may be integrally attached to the predetermined position of the electric wire 17 by molding.

The electric wire integrated clamp mark 100 includes a mark main body 19 surrounding the entire circumference of the electric wire 17 and flange parts 23 respectively formed on the two end sides of the mark main body 19 in the axial direction of the electric wire 17. A non-circular part 21 is formed in the outer peripheral surface of the mark main body 19.

The mark main body 19 is integrally molded out of resin material at the predetermined position of the electric wire 17 in the axial direction thereof while orientated in a predetermined rotation direction, and surrounds the entire circumference of the electric wire 17. In this embodiment, the mark main body 19 is molded at the position of at least a part of the electric wire in the axial direction thereof into a non-circular shape. In other words, a cross section of the mark main body 19, which is perpendicular to the axial direction, is not precise circle.

In the present embodiment, the non-circular part 21 is formed such that the outer shape of its section perpendicular to the axial direction of the electric wire 17 provides a drop-like pillar shape. The drop shape has an outer shape obtained when a large diameter circle and a small diameter circle are connected together by a pair of tangent lines owned in common by them. Here, in the electric wire integrated clamp mark of the invention, the non-circular part may have, in addition to the drop shape, an oval shape, an elliptical shape, a semi-circular shape, a triangular shape, a square shape, a parallelogram shape, a rhombus shape, a trapezoidal shape, a regular polygonal shape, and other unequal piece polygonal shapes etc.

Also, in this embodiment, the flange part 23 is formed in a collar-like shape having a larger diameter than the non-circular part 21 so as to project outward in the radial direction beyond the non-circular part 21 from an outer peripheral surface of the mark main body 19. The flange parts 23 are formed respectively on the two end sides of the mark main body 19 in the axial direction of the electric wire 17. That is, the electric wire integrated clamp mark 100 of this embodiment is formed in a spool-like shape including a pair of flange parts 23 respectively formed in the two ends of the mark main body 19.

Here, the flange part according to the invention is not limited to the collar-like flange part 23 formed continuously along the outer peripheral surface of the mark main body 19 but can also be constituted of multiple projections intermittently projected along the outer peripheral surface of the mark main body 19.

The mark main body 19, due to its drop-shaped outer peripheral surface, includes a pair of nonparallel flat outer surfaces. The distance between the paired outer surfaces gradually increases. A large diameter electric wire 15 is molded on the side where the distance between the outer surfaces is large, while a small diameter electric wire 13 is molded on the side where the distance is small. That is, the mark main body outer surface is formed such that a surplus thick portion can be reduced.

The mark main body 19 includes, in the paired flat outer surfaces, reduced-thickness parts 24, 25 which are described later. In this embodiment, the reduced-thickness parts 24, 25 are respectively formed in each of the paired flat outer surfaces. However, the reduced-thickness parts 24, 25 of the invention may also be formed in any one of the paired outer surfaces. To form the reduced-thickness part, for example, the central portion of the outer surface can be recessed leaving the outer surface in a frame shape.

Figure 2:
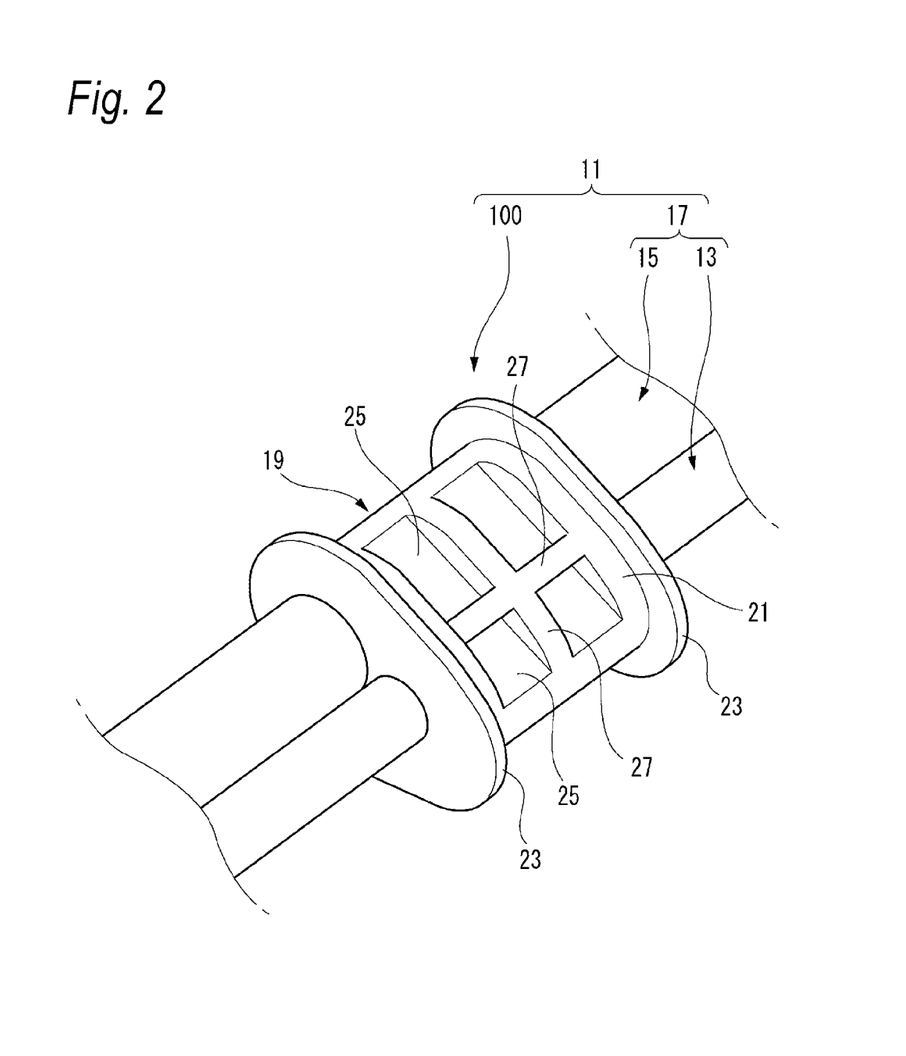
FIG. 2 is a perspective view of the electric wire integrated clamp mark shown in FIG. 1, when viewed from a counter-gate side surface disposed opposed to a gate side surface.

As shown in FIGS. 1 and 2, according to the electric wire integrated clamp mark 100, in the paired flat outer surfaces of the non-circular part 21, specifically, in the gate side surface (in FIG. 1, the upper surface) thereof corresponding to a gate in molding, there is formed a reduced-thickness part 24 constituted of a flat surface part; and, in the counter gate side surface (in FIG. 2, the upper surface) thereof disposed on the opposite side to the gate side surface across the electric wire 17, there is formed a reduced-thickness part 25 constituted of a concave part having a rib 27. Supposing the bottom surfaces of, for example, four reduced-thickness parts 25 have a rectangular shape, the rib 27 can be molded into a cross shape protruding from the bottom surfaces. Thus, there is formed a gate trace 30 in the center of the reduced-thickness part 24 formed in the gate side surface (see FIG. 1).

Figure 3:
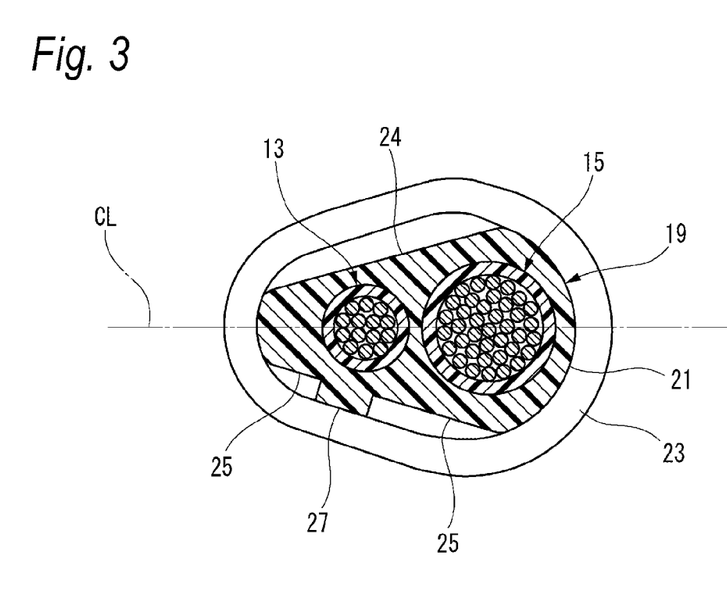
FIG. 3 is an arrow view of a section of the electric wire integrated clamp mark shown in FIG. 1, taken along the arrow III-III line of FIG. 1.

As shown in FIG. 3, in the non-circular part 21, the bottom surfaces of the reduced-thickness parts 24, 25 of the gate side surface and counter gate side surface are adjacent to the small diameter electric wire 13 and large diameter electric wire 15. Thus, a surplus large thickness part is eliminated from the non-circular part 21, whereby shrinkage is hard to occur in the non-circular part 21 during molding. The non-circular part 21 is configured such that the lowered adhesion (play) thereof due to irregular recesses caused in the outer surface thereof by shrinkage during molding can be prevented.

Meanwhile, since the outer surface of the non-circular part 21 is adjacent to the electric wire 17, on the counter gate side surface side of the electric wire 17 opposite to the gate side surface, the flowability of molten resin during molding lowers. Thus, the non-circular part 21 includes the rib 27 in the bottom surface of the reduced-thickness part 25 of the counter gate side surface. The rib 27 protrudes in a direction away from the electric wire 17. Thus, the rib 27 can secure the flow path space of molten resin during molding between the electric wire 17 and the molding surface (lower cavity 55) of the mold 31.

Also, the electric wire integrated clamp mark 100 is configured such that the outer shape of its section perpendicular to the axial direction of the electric wire 17 is formed line symmetric. In this embodiment, as shown in FIG. 3, the section outer shape is line symmetric with a line segment CL passing through the centers of the small diameter electric wire 13 and large diameter electric wire 15. Here, the [line symmetric shape] should not contain a relatively small uneven portion such as the rib 27.

Figure 4:
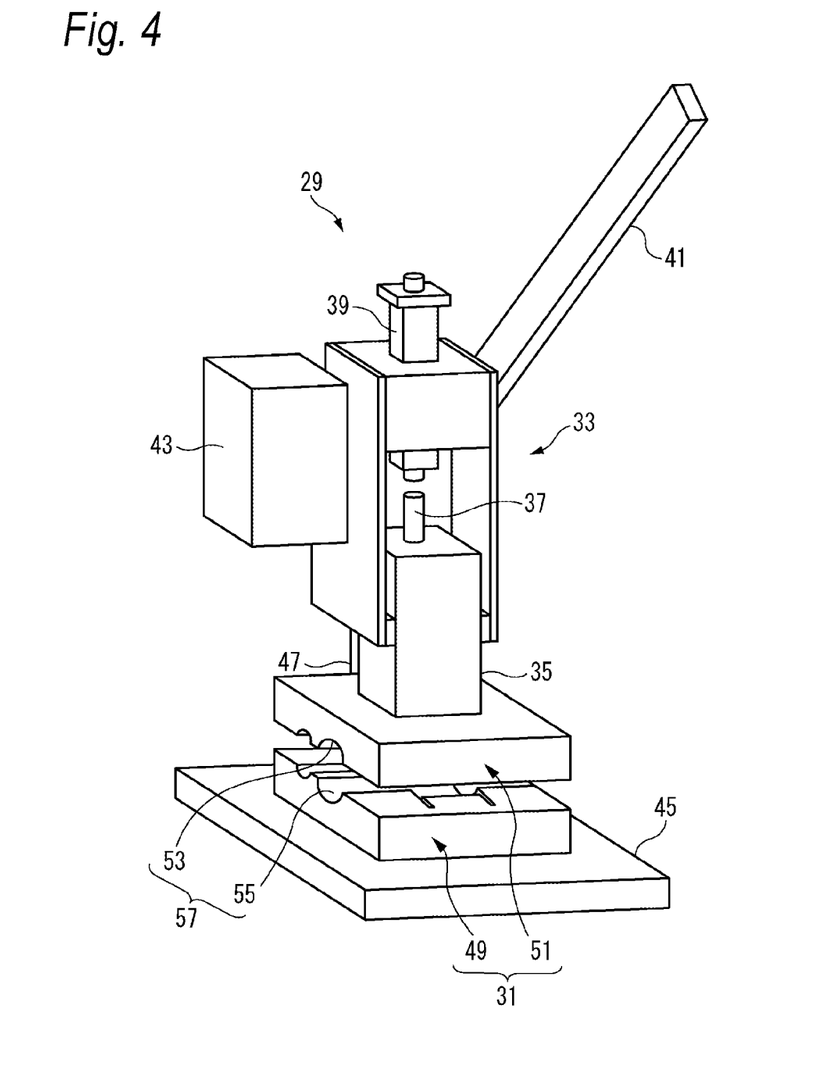
FIG. 4 is a perspective view of the whole of a micro molding machine for micro molding the electric wire integrated clamp mark shown in FIG. 1.

FIG. 4 is a perspective view of the whole of a micro molding machine for micro molding the electric wire integrated clamp mark 100.

Next, description is given of a micro molding machine 29 for molding the electric wire integrated clamp mark 100 in the battery cable 11 integrally therewith.

As shown in FIG. 4, the micro molding machine 29 for molding the electric wire integrated clamp mark 100 integrally with the battery cable 11 can be operated by a single worker without external power such as an electric motor, and includes: a mold 31 made of metal or synthetic resin; a clamping device (not shown); and, a low pressure injection device 33 for injecting molten resin under pressure into the mold 31.

The low pressure injection device 33 includes a heating cylinder 35 equipped with a heater for heating and melting synthetic resin material such as polypropylene, a plunger 37 for injecting molten resin within the heating cylinder from a nozzle (not shown), an injection cylinder 39 for advancing the plunger 37, a handle 41 for driving the injection cylinder 39, and a temperature controller 43 for maintaining the heating temperature of the heating cylinder 35 at a desired temperature, while these composing elements are supported on a device stand 47 erected on a pedestal 45.

Here, the micro molding machine 29 of this embodiment is a machine in which the amount of resin moldable by one injection molding is about 10 g at maximum and also which, when clamping the mold 31, can be manually operated using an air cylinder, a link or the like. Therefore, the low pressure injection device 33 may also be configured such that the injection cylinder 39 is driven by external power such as an electric motor or air. More specifically, as the micro molding machine 29, there can be used a known [injection molding apparatus] which is disclosed in, for example, Japanese Patent Publications No. 2010-260297, No. 2012-30429 and 2013-103492.

The mold 31 is a horizontal split mold including a lower mold 49 and an upper mold 51, while an upper cavity 53 is formed in the downward facing mold split surface (lower surface) of the upper mold 51. Also, in the upward facing mold split surface (upper surface) of the lower mold 49, there is formed a lower cavity 55 having the same shape as the upper cavity 53. And, when the lower mold 49 and upper mold 51 are clamped and combined together, the lower cavity 55 and upper cavity 53 are united together to thereby define a cavity 57 therein. The mold 31 is clamped in a state where the electric wire 17 is arranged inside the cavity 57.

The upper mold 51 includes a gate (not shown) which allows the cavity 57 and the nozzle of the low pressure injection device 33 to communicate with each other.

In a clamping step, the mold 31 is clamped with the electric wire 17 arranged in the cavity 57, thereby defining a resin material filling space between the cavity 57 and electric wire 17. In the mold 31, the capacity of the filling space when clamped is several $cm^3$. Here, in this embodiment, description has been given of a case in which the mold 31 is a horizontal split mold. However, a vertical split mold may also be used.

In an injection step following the clamping step, molten synthetic resin is injected at low pressure from the gate. The molten resin injected into the cavity 57 is filled into the filling space. In this embodiment, the filling space is formed in a non-circular spool-like shape. When the resin material filled in the filling space is solidified, the electric wire integrated clamp mark 100 is molded at the predetermined position of the electric wire 17 integrally therewith.

The electric wire integrated clamp mark 100 molded integrally with the electric wire 17 is mounted with a fixed strength which prevents it from moving with respect to the electric wire 17 in the range of a prescribed electric wire holding strength. In other words, the electric wire integrated clamp mark 100, by applying a force equal to or greater than the prescribed electric wire holding strength, can be made to move along the electric wire 17. In this case as well, after fixed to a vehicle panel or the like by a clamp 59 (clamp member) mounted on the non-circular part 21, the movement of the electric wire integrated clamp mark 100 with respect to the electric wire 17 is regulated.

Figure 5:
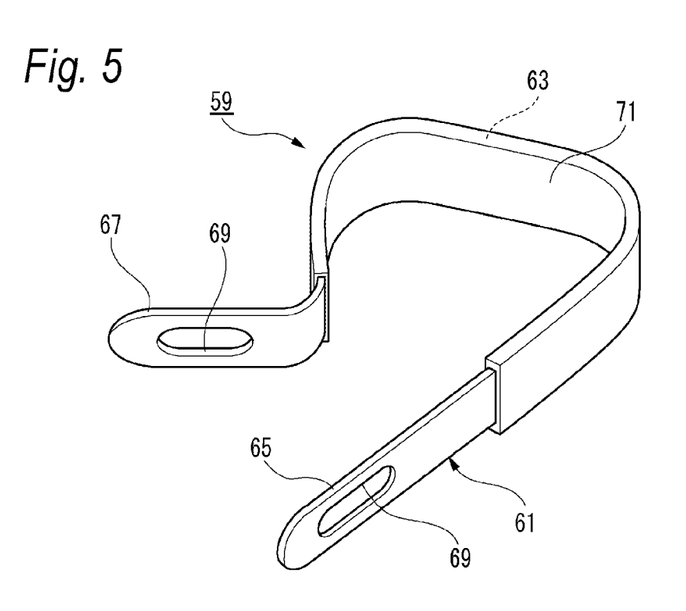
FIG. 5 is a perspective view of a clamp member used in the electric wire integrated clamp mark shown in FIG. 1.

As the clamp 59, as shown in FIG. 5, there is used a clamp different from the conventional P clamp 513 (see FIG. 9B). That is, it is a substantially R-shaped clamp member in which a clamp main body part 61 is made of a belt-shaped metal plate, and a fixing piece part 65 and a tightening piece part 67 each having a strip-like shape are connected to the two ends of an arc shaped part 63, while the inner peripheral space of the arc shaped part 63 has a non-circular shape. That is, in the conventional P clamp 513, the inner peripheral space of the arc shaped part 63 has a cylindrical shape, whereas in the clamp 59 of this embodiment, the inner peripheral space of the arc shaped part 63 has a non-circular shape. This non-circular shape is a shape conforming to the drop-shaped outer surface of the non-circular part 21. In the tightening piece part 67 and fixing piece part 65 of the clamp 59, there are drilled bolt penetration holes 67 through which mounting bolts 80 can be inserted.

Also, a rubber-made cushion member 71 is provided in the periphery of the arc shaped part 63 of the clamp 59. The section of the cushion member 71 in a direction along the axis of the mark main body 19 provides a substantially O-like shape, thereby enabling the cushion member 71 to cover the entire peripheral surface of the arc shaped part 63. Here, the cushion member may also be configured such that its section in a direction along the axis of the mark main body 19 has a substantially C-like shape, thereby covering the inner peripheral surface of the arc shaped part 63.

The electric wire integrated clamp mark 100 of this embodiment is molded out of resin material (such as polypropylene) harder than the rubber of the cushion member 71. Thus, when the clamp 59 is tightened to the non-circular part 21 of the mark main body 19, the cushion member 71 is elastically deformed and is closely contacted with the reduced-thickness parts 24, 25 of the non-circular part 21. Also, the rib 27 bites into the cushion member 71 bulging toward the reduced-thickness part 25.

Figure 7:
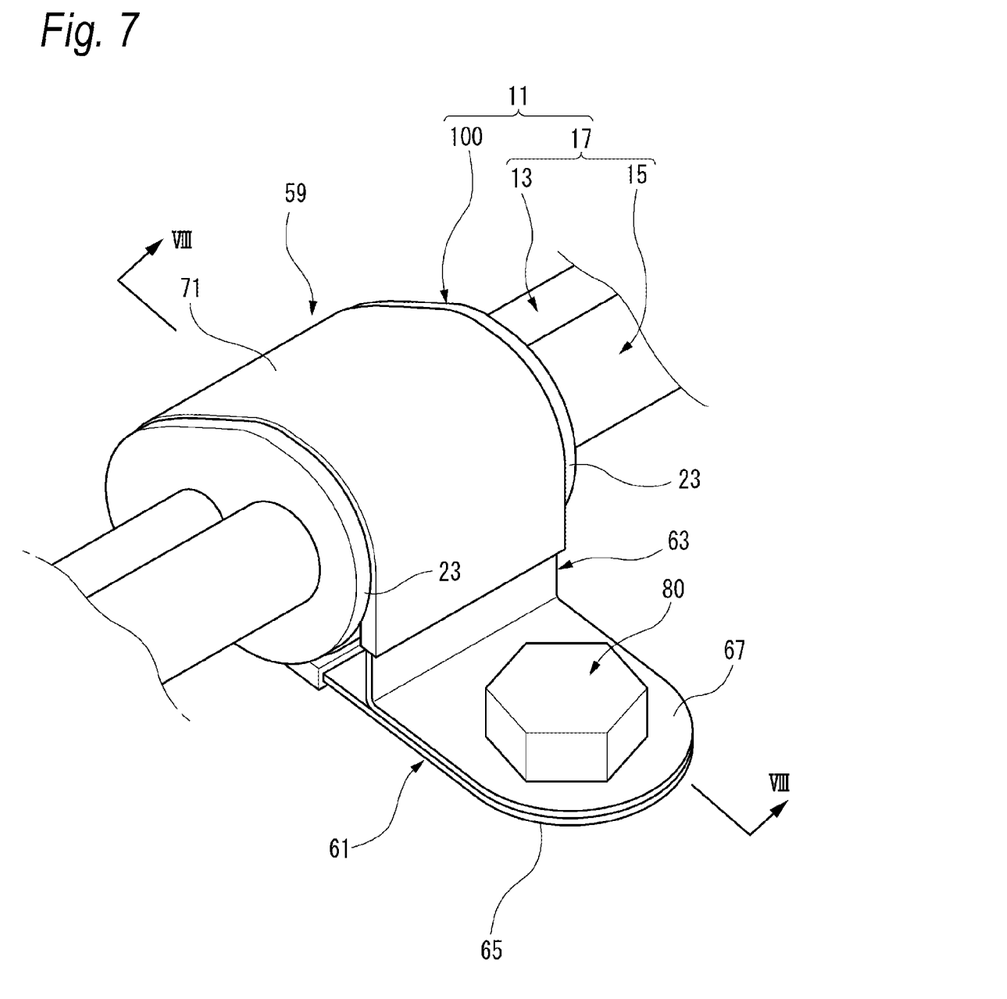
FIG. 7 is a perspective view of a state where the clamp member is fixed to the electric wire integrated clamp mark shown in FIG. 1.
Figure 8:
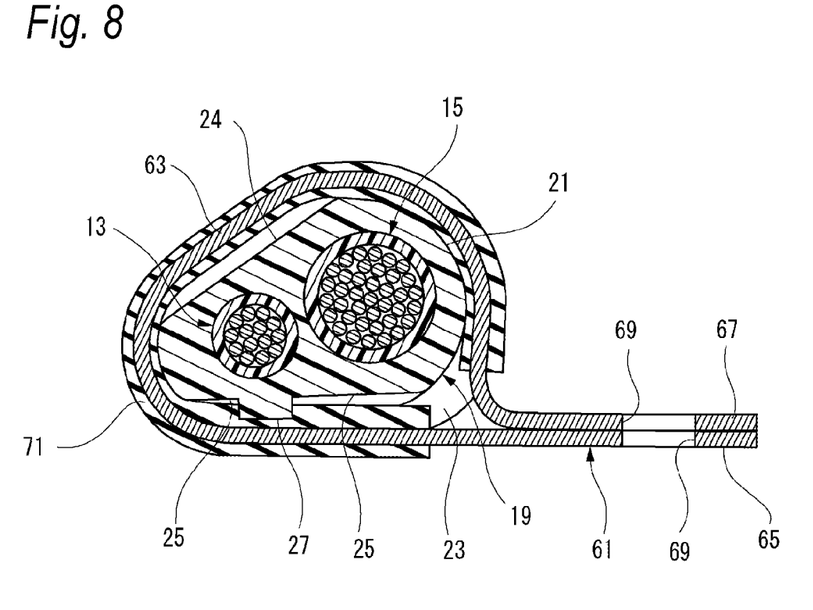
FIG. 8 is an arrow view of a section of the electric wire integrated clamp mark and clamp member shown in FIG. 7, taken along the VIII-III arrow of FIG. 7.

As shown in FIGS. 7 and 8, when the tightening piece part 65 and fixing piece part 63 are tightened by mounting bolts (fastening tool) 80 penetrating through the bolt penetration holes 69 of these two piece parts, the clamp 59 surrounds and tightens the non-circular part 21 of the electric wire integrated clamp mark 100. In this case, the mounting bolts 80 are penetrated through clamp mounting holes drilled in a vehicle body panel or a bracket to tighten together the vehicle panel or the like and the clamp 59, whereby the battery cable 11 is fixed through the electric wire integrated clamp mark 100 to the predetermined position of the vehicle panel or the like by the clamp 59.

Figure 6:
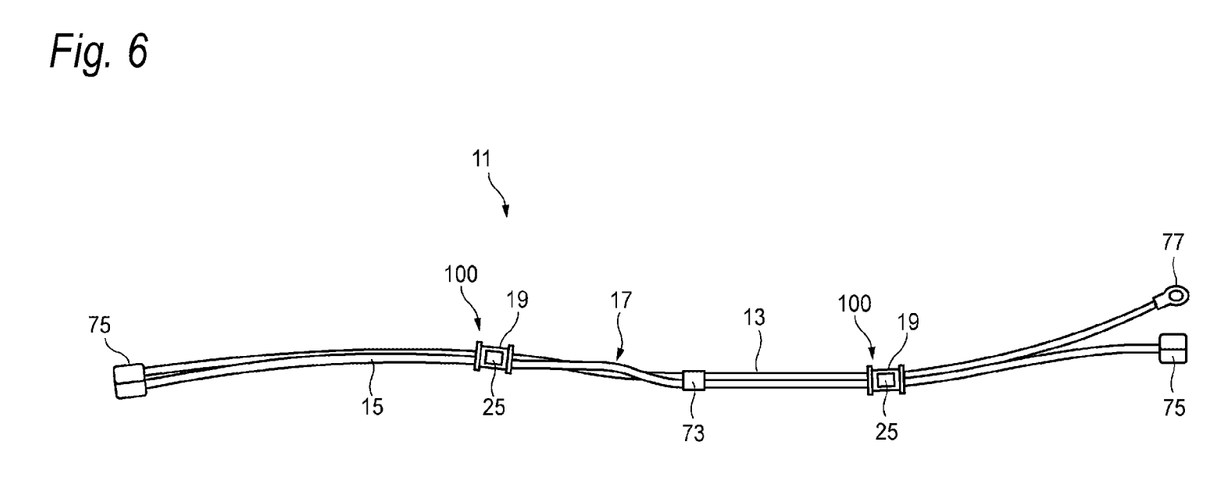
FIG. 6 is a plan view of a wire harness equipped with the electric wire integrated clamp mark shown in FIG. 1.

As shown in FIG. 6, the battery cable 11 is configured such that multiple (in the illustrated example, two) electric wires 17 are collected by vinyl tape 73 and divided into main lines and branch lines, and connectors 75 and terminals 77 are attached to the ends of the respective electric wires 17. The battery cable 11 is manufactured in advance with a predetermined length. In the battery cable 11, at the predetermined position thereof in the axial direction of the electric wire 17, there is molded the electric wire integrated clamp marks 100 while it is oriented in a predetermined rotation direction. Molding of the electric wire integrated clamp mark 100 at the predetermined position of the battery cable 11 enables the battery cable 11 to enhance its mounting position accuracy with respect to the vehicle.

Next, description is given of the operation of the above configuration.

In the electric wire integrated clamp marks 100 of this embodiment, at the predetermined position of the electric wire 17 in the axial direction, the mark main body 19 surrounding the entire circumference of the electric wire 17 is molded out of resin material integrally with the electric wire 17. This enables the electric wire integrated clamp mark 100 to be mounted in the axial direction of the electric wire 17 with high position accuracy, while preventing it against position deviation. Also, the non-circular part 21 is formed in the outer peripheral surface of the mark main body 19. In the electric wire integrated clamp marks 100, the non-circular part 21 of the mark main body 19 serves as a tightened surface to be surrounded by and tightened to the arc shaped part 63 of the clamp 59. As the clamp 59, there is used a clamp configured such that the inner peripheral shape of the arc shaped part 63 follows the outer peripheral shape of the non-circular part 21. Supposing the outer shape of the section of the non-circular part 21 perpendicular to the axial direction of the electric wire 17 is, for example, a drop-like shape, the inner peripheral shape of the arc shaped part 63 also has the same drop-like shape. Thus, in the electric wire integrated clamp marks 100 in which the non-circular part 21 of the mark main body 19 is tightened and fixed to the arc shaped part 63 of the clamp 59, when assembling it to the vehicle, the orientation of the rotation direction of the mark main body 19 is regulated. Accordingly, the electric wire integrated clamp marks 100 to be tightened and fixed using the clamp 59 will not be assembled in a state where the electric wire 17 is twisted.

Also, in the electric wire integrated clamp marks 100, since the mark main body 19 is molded out of resin material integrally therewith and the non-circular part 21 is tightened to the arc shaped part 63 of the clamp 59, after assembled to the vehicle, the mark main body is prevented from being rotated with respect to the clamp 59 even by the oscillation thereof caused by a force applied to the electric wire 17. This can prevent occurrence of twisting of the electric wire 17 after assembled to the vehicle.

Also, since the mark main body 19 is molded integrally with the electric wire 17 over the entire circumference thereof, sand or the like is prevented from entering between the electric wire 17 and mark main body 19 while driving the vehicle. This eliminates a fear that, while driving the vehicle, a sheath 14 can be worn by sand or the like entering between the electric wire 17 and mark main body 19.

Further, in the electric wire integrated clamp marks 100 of this embodiment, since the relative movements of the mark main body 19 and clamp 59 in the axial direction are regulated, the mounting position accuracy of the clamp 59 can be enhanced further and the mark main body 19 can be positively prevented from coming off from the clamp 59.

And, in the electric wire integrated clamp mark 100, since the outer shape of its section perpendicular to the axial direction of the electric wire 17 is formed line symmetric, the clamp 59 can be used by reversing it in such a manner that the overlapping direction of the fixing piece part 65 and tightening piece part 67 respectively formed in the two ends of the arc shaped part 63 of the clamp 59 can be upside down. Thus, the number of parts can be reduced.

Also, according to the electric wire integrated clamp mark 100, the bottom surface of the reduced-thickness part 25 formed in the counter gate side surface is adjacent to the electric wire 17, and the rib 27 protrudes from this bottom surface. According to the mark main body 19, in molding, the lower cavity 55 serving as the molding surface of the mold 31 for molding the bottom surface of the reduced-thickness part 25 comes near to the electric wire 17. Meanwhile, in this lower cavity 55, in a direction away from the electric wire 17, there is formed a rib molding groove for molding the rib 27. Thus, molten resin is easy to flow toward the counter gate surface side of the electric wire 17 through the rib molding groove. That is, the moldability of the reduced-thickness part 25 to be formed on the opposite side to the gate across the electric wire 17 can be enhanced. Further, since the rib 27 bites into a cushion member 71 such as rubber provided on the inner peripheral side of the arc shaped part 63 of the clamp 59, even when there are caused variations in the tightening force of the clamp 59 which tightens the non-circular part 21 of the mark main body 19, the rotation of the mark main body 19 with respect to the clamp 59 can be suppressed, thereby making it possible to secure the holding performance of the electric wire 17.

Also, according to the battery cable 11 of this embodiment, when assembling it to the vehicle, the clamp 59 can regulate the orientation of the electric wire rotation direction of the electric wire integrated clamp mark 100. Accordingly, the battery cable 11, when assembling it to the vehicle using the clamp 59, can be assembled in the axial direction and rotation direction of the electric wire 17 with high position accuracy. Thus, twisting of the electric wire 17 when assembling the battery cable to the vehicle can be prevented. The battery cable 11 is easier to be connected with its mating connector and mating terminal part, whereby the workability of the operation to assemble it to the vehicle can be enhanced. Also, the battery cable 11, after assembled to the vehicle, can prevent the position deviation of the electric wire 17 in the axial direction and rotation direction. Thus, twisting of the electric wire 17 due to vibrations can also be prevented.

Therefore, according to the electric wire integrated clamp mark 100 and battery cable 11 of this embodiment, when assembling them to the vehicle, the orientation of the electric rotation direction can be regulated and, after assembled, rotation of the electric wire 17 due to vibrations or the like can be prevented.

Here, the characteristics of the above embodiments of the electric wire integrated clamp mark and wire harness according to the invention are briefly summarized and listed below.

(i) A clamp mark (100), including:
a mark main body (19), made of resin material by molding, and configured to cover a circumference of an electric wire (17) entirely in a circumference direction of the electric wire (17) at a predetermined position of the electric wire (17) in an axial direction of the electric wire (17); and
flange parts (23) respectively provided on both end portions of the mark main body (19) in the axial direction of the electric wire (17) so as to project outward in a radial direction of the electric wire (17) from an outer peripheral surface of the mark main body (19),
wherein a cross section of the mark main body (19), which is perpendicular to the axial direction, is not precise circle.

(ii) The clamp mark according to the above (i), wherein
the cross section of the mark main body (19) has line symmetric shape.

(iii) The clamp mark according to the above (i) or (ii), wherein
a reduced-thickness portion (24, 25) is provided on the outer peripheral surface of the mark main body (19) at a counter gate side which is opposite to a gate side that a gate is disposed for the molding.

(iv) The clamp mark according to the above (iii), wherein
a rib (27) is provided in the reduced-thickness portion (25).

(v) A wire harness (11), comprising:
the electric wire (17); and
the clamp mark (100) according to any one of the above (i) to (iv), which is integrally molded with the electric wire (17).

According to the electric wire integrated clamp mark having the above (i), the mark main body surrounding the entire circumference of the electric wire is molded out of resin material integrally with the electric wire at the predetermined position thereof in the axial direction thereof. Thus, the electric wire integrated clamp mark can be mounted in the axial direction of the electric wire with high position accuracy and can be prevented against position deviation. The cross section of the mark main body, which is perpendicular to the axial direction, is not precise circle. In other words, in the outer peripheral surface of the mark main body, there is formed the non-circular part. The non-circular part of the mark main body serves as a tightened surface which is surrounded and tightened by the arc shaped part of the clamp member. The clamp member used here is configured such that the inner peripheral shape of the arc shaped part extends along the outer peripheral shape of the non-circular part. Thus, in an electric wire integrated clamp mark in which the non-circular part of the mark main body is tightened and fixed to the arc shaped part of the clamp member, when assembling it to the vehicle, the orientation of the rotation direction of the mark main body can be regulated. In the electric wire integrated clamp mark to be tightened and fixed using the clamp member, there is no fear that it can be mounted in a state where the electric wire is twisted. Also, in this electric wire integrated clamp mark, since the non-circular part of the mark main body is tightened to the arc shaped part of the clamp member, after assembled to the vehicle, even when the electric wire is oscillated by a force applied thereto, the mark main body will not be rotated with respect to the clamp member. This can prevent the electric wire from being twisted after assembled to the vehicle.

According to the electric wire integrated clamp mark having the above (ii), the clamp member can be reversed and used such that the overlapping direction of a fixing piece part and a tightening piece part respectively formed in the arc shaped part of the clamp member is upside down. This can reduce the number of parts.

According to the electric wire integrated clamp mark having the above (iii), the reduced-thickness portion of the counter-gate side surface is formed such that its bottom surface is disposed adjacent to the electric wire and the rib protrudes from this bottom surface. When molding the mark main body, the molding surface of a mold for molding the bottom surface of the reduced-thickness portion comes close to the electric wire.

According to the electric wire integrated clamp mark having the above (iv), in this molding surface, a rib molding groove for molding the rib is formed in a direction away from the electric wire. This makes it easy for molten resin to flow through the rib molding groove toward the counter-gate surface side of the electric wire. That is, this can enhance the moldability of a reduced-thickness portion to be formed on the opposite side to the gate across the electric wire. Further, biting of the rib into a cushion member such as rubber arranged on the inner peripheral side of the arc shaped part of the clamp member can suppress the rotation of the mark main body with respect to the clamp member to thereby secure the holding performance of the electric wire in spite of variations in the tightening force of the clamp member which tightens the non-circular part of the mark main body.

According to the wire harness having the above (v), when assembling it to the vehicle, the clamp member can regulate the orientation of the electric wire rotation direction of the electric wire integrated clamp mark. Due to this, the wire harness, when assembling it to the vehicle using the clamp member, can be assembled in the axial direction and rotation direction of the electric wire with high position accuracy. As a result, twisting of the electric wire when assembling the wire harness to the vehicle can be prevented. The wire harness is easier to be connected with its mating connector or mating terminal part, thereby enabling enhancement in the workability of an operation to assemble it to the vehicle. And, the wire harness, after assembled to the vehicle, can also prevent the electric wire against position deviation in the axial direction and rotation direction thereof.

According to the electric wire integrated clamp mark and wire harness of the invention, when assembling them to the vehicle, the orientation of the electric wire rotation direction can be regulated and, after assembled to the vehicle, the electric wire can be prevented from being rotated due to vibrations or the like.

Here, the invention is not limited to the above embodiment but can be properly changed or improved. Also, the materials, shapes, dimensions, numbers, arrangement positions and the like of the respective composing elements of the above embodiment are arbitrary and are not limitative as long as they can attain the invention.

What is claimed is:
1. A clamp mark, comprising:
a mark main body, made of a molded resin material by molding, and configured to cover an entire circumference of an electric wire entirely in a circumferential direction of the electric wire at a predetermined position of the electric wire in an axial direction of the electric wire; and flange parts respectively provided on both end portions of the mark main body in the axial direction of the electric wire so as to project outward in a radial direction of the electric wire from an outer peripheral surface of the mark main body, wherein a cross section of the mark main body, in a direction perpendicular to the axial direction, has an outer shape of a drop.

2. The clamp mark according to claim 1, wherein the cross section of the mark main body has a line symmetric shape.

3. The clamp mark according to claim 1, wherein a reduced-thickness portion is provided on the outer peripheral surface of the mark main body at a counter gate side which is opposite to a gate side that a gate is disposed for molding of the mark main body.

4. The clamp mark according to claim 3, wherein a rib is provided in the reduced-thickness portion.

5. A wire harness, comprising:

an electric wire; and the clamp mark according to claim 1, which is integrally molded with the electric wire.

6. The wire harness according to claim 5, wherein the electric wire comprises a small diameter electric wire and a large diameter electric wire.

7. The clamp mark according to claim 1, wherein the outer shape of the drop is defined by a large diameter virtual circle and a small diameter virtual circle connected together by a pair of virtual tangent lines.

8. A fixing structure of a wire harness, comprising:

a clamp mark configured to be fixed to an electric wire; and a clamp member configured to be attached to the clamp mark, wherein the clamp mark includes:

a mark main body, made of a molded resin material, and configured to cover an entire circumference of the electric wire in a circumferential direction of the electric wire at a predetermined position of the electric wire in an axial direction of the electric wire; and flange parts respectively provided on both end portions of the mark main body in the axial direction of the electric wire so as to project outward in a radial direction of the electric wire from an outer peripheral surface of the mark main body, wherein a cross section of the mark main body, which is perpendicular to the axial direction of the electric wire, is not a precise circle, so as to prevent the clamp mark from being rotated with respect to the clamp member.

9. The fixing structure according to claim 8, wherein the clamp member is tightened to the outer peripheral surface of the mark main body.

* * * * *